(12) United States Patent
Emerson et al.

(10) Patent No.: US 7,063,039 B2
(45) Date of Patent: Jun. 20, 2006

(54) TRAILER POSITION INDICATOR

(75) Inventors: Blair Emerson, Arlington, TX (US); Michael L. Hyer, Benbrook, TX (US)

(73) Assignee: M Management-Tex, Ltd., Forth Worth, TX (US)

( * ) Notice: Subject to any disclaimer, the term of this patent is extended or adjusted under 35 U.S.C. 154(b) by 0 days.

(21) Appl. No.: 10/830,674

(22) Filed: Apr. 23, 2004

(65) Prior Publication Data

US 2004/0211351 A1   Oct. 28, 2004

Related U.S. Application Data

(60) Provisional application No. 60/465,051, filed on Apr. 24, 2003.

(51) Int. Cl.
*B01Q 1/48* (2006.01)
(52) U.S. Cl. ............... 116/28 R; 116/35 R; 114/344
(58) Field of Classification Search ............ 116/28 R, 116/209, 35 R; 33/286, 288, 264; 114/344
See application file for complete search history.

(56) References Cited

U.S. PATENT DOCUMENTS

| | | | |
|---|---|---|---|
| 1,784,466 A * | 12/1930 | Rensonnet | 33/264 |
| 2,389,338 A * | 11/1945 | Zorc, Jr. | 114/344 |
| 2,442,071 A * | 5/1948 | Bunten | 114/344 |
| 2,883,752 A * | 4/1959 | Oakley | 33/286 |
| 3,046,388 A * | 7/1962 | Shinn | 116/28 R |
| 3,064,617 A | 11/1962 | Meagher | |
| 3,742,534 A * | 7/1973 | Guest | 114/344 |
| 3,863,594 A | 2/1975 | Gawthrop | |
| 3,918,746 A * | 11/1975 | Lehtisaari | 33/264 |
| 4,684,145 A * | 8/1987 | Tingley | 114/344 |
| 4,940,251 A | 7/1990 | Willmsen | |
| 4,958,436 A | 9/1990 | Tusche | |
| 5,186,119 A * | 2/1993 | Hlavin | 116/209 |
| 5,596,944 A | 1/1997 | Massie | |
| 5,755,453 A | 5/1998 | Bell | |
| 5,996,869 A * | 12/1999 | Belinky et al. | 116/28 R |
| 6,062,160 A | 5/2000 | Delcambre | |
| 6,199,503 B1 | 3/2001 | Midgett | |
| 6,557,483 B1 * | 5/2003 | Nathan | 116/28 R |
| 2002/0148124 A1 * | 10/2002 | Strange | 33/264 |
| 2004/0011273 A1 * | 1/2004 | Gorbutt | 114/344 |

* cited by examiner

*Primary Examiner*—Diego Gutierrez
*Assistant Examiner*—Travis Reis
(74) *Attorney, Agent, or Firm*—Patton Boggs LLP

(57) ABSTRACT

A trailer position indicator having a trailer attachment member, a boom arm, and a guidance member is provided. The trailer attachment member is configured to be attached to a cross member of a boat trailer. The boom arm is pivotally connected at a lower end to the trailer attachment member, and the guidance member is connected to the upper end of the boom arm. A torsion spring is operably connected to the boom arm and trailer attachment member to bias the boom arm toward an extended position, yet allow the boom arm to be pushed to a stowed position as a boat is loaded on the trailer. A bracket protector is attached to the trailer attachment member and a protective sleeve is disposed on the boom arm for protecting the boat during loading and unloading.

12 Claims, 5 Drawing Sheets

TRAILER POSITION INDICATOR

CROSS-REFERENCE TO RELATED APPLICATIONS

This application claims the benefit of U.S. Provisional Application No. 60/465,051 filed Apr. 24, 2003, which is hereby incorporated by reference.

BACKGROUND OF THE INVENTION

1. Field of the Invention

This invention relates generally to trailers and in particular to a position indicator that allows a driver to quickly and easily determine a position of a trailer in tow.

2. Description of Related Art

Towing a trailer can present significant challenges to the driver of a vehicle to which the trailer is connected. The driver must remain mindful about the trailer's size, weight, and location at all times. For example, if the trailer is wider than the vehicle or the load carried by the trailer is taller than the vehicle, the driver must vigilantly ensure that the trailer and its load do not impact vehicles, buildings, road signs, bridges, or other structures near the road. When rounding corners, trailers tend to take a less-rounded path than that of the vehicle. The driver should make sure that the trailer does not strike other vehicles, curbs, or traffic signals while making a turn. Also, the additional weight imposed on the vehicle by the trailer can create braking difficulties. Drivers are required to exercise extreme caution when slowing or stopping the vehicle and the trailer because of the often diminished breaking capacity of the vehicle.

Perhaps the greatest challenge to a driver is backing the trailer. As the vehicle moves in reverse, the trailer will pivot at its connection point to the vehicle, and will often stray from the path desired by the driver. To complicate matters further, the process of "steering" the trailer while the vehicle moves backwards is often counter-intuitive to many drivers. If the rear of the vehicle is directed toward the left (i.e. by turning the steering wheel left), the trailer will begin to move toward the right as the vehicle moves backwards. If the rear of the vehicle is directed toward the right, the trailer will travel to the left.

Backing the trailer is made even more difficult when the driver cannot see the trailer as the driver peers through the rear window of the vehicle. This commonly occurs when the trailer's load has been removed, and the trailer is directly behind the vehicle. If the vehicle is a large car or truck, or if the trailer is especially short, it may not be possible to see the trailer below the rear portion of the vehicle. If the trailer is a boat trailer, the trailer may also be hidden beneath the surface of the water as the trailer is backed down a boat ramp. Especially skilled drivers are still able to back an unseen trailer by using side mirrors on the vehicle to determine when the path of the trailer varies from that of the vehicle. However, it is very difficult for drivers not having these special skills to back an unseen trailer.

A need therefore exists for an apparatus that would assist drivers in backing a trailer that cannot be seen when the trailer is directly behind the vehicle. A need also exists for an apparatus that is easily integrated with existing trailers and that will not interfere with the load carried by the trailer. Finally, a need exists for an apparatus that is easy and inexpensive to manufacture.

BRIEF SUMMARY OF THE INVENTION

A trailer position indicator having a trailer attachment member, a boom arm, and a guidance member is provided for assisting a driver in determining the location of a trailer behind the driver's vehicle. The trailer attachment member allows the trailer position indicator to be attached to a cross-member of a trailer. The boom arm is pivotally attached to the trailer attachment member and is biased toward an extended position by a torsion spring operably connected to the boom arm and the trailer attachment member. A guidance member is attached to an end of the boom arm opposite the boom arm's pivotal connection to the trailer attachment member.

A depth ring is adjustably disposed around the boom arm for use with boat trailers. The depth ring allows a driver to determine the relative depth of the water as the boat trailer is being backed down a boat ramp.

A protective sleeve is disposed on the boom arm to protect objects being loaded on the trailer as the objects come in contact with the boom arm. The protective sleeve is preferably polyurethane that is over-molded onto the boom arm for a snug fit. Another protective element is the bracket protector, which preferably is an L-shaped device that is connected to the trailer attachment member. The bracket protector prevents objects being loaded onto the trailer from contacting the trailer attachment member. Preferably, the bracket protector is made from high density polyethylene.

Other objects, features, and advantages of the present invention will become apparent with reference to the drawings and detailed description that follow.

DETAILED DESCRIPTION OF THE PREFERRED EMBODIMENT

Figure 1:
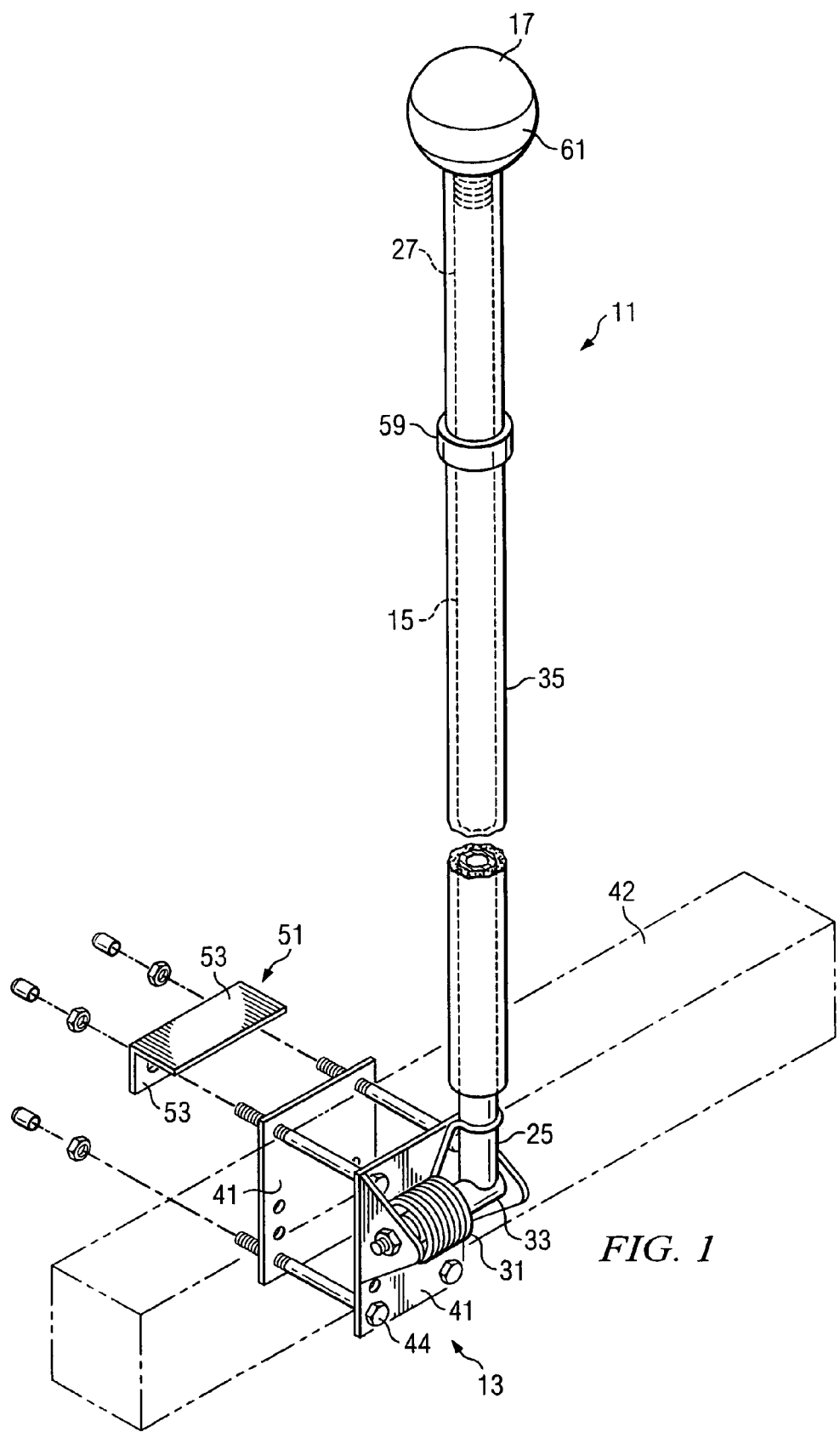
FIG. 1 depicts a perspective view of a trailer position indicator according to the present invention in an "exploded" configuration, the trailer position indicator having a boom arm and a guidance member pivotally attached to a trailer attachment member.

In the following detailed description of the preferred embodiments, reference is made to the accompanying drawings, which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and material changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring to FIGS. 1–5, a trailer position indicator 11 according to the present invention includes a trailer attachment member 13, a boom arm 15, and a guidance member 17. The boom arm 15 includes a lower end 25 pivotally connected to the trailer attachment member 13. The guidance member 17 is rigidly attached to an upper end 27 of the boom arm 15. A torsion spring 31 is operably attached to the trailer attachment member 13 and the lower end 25 of the boom arm 15 such that the boom arm 15 is biased toward an extended position.

Boom arm 15 is preferably constructed of galvanized steel tubing that is welded or otherwise attached at lower end 25 to a boom sleeve 33 also constructed of galvanized steel. The length of boom arm 15 could vary depending on the type of trailer to which trailer position indicator 11 is attached. The upper end 27 of the boom arm 15 preferably includes threads (not shown) on an external surface of the boom arm 15 for attaching guidance member 17.

A protective sleeve 35 is disposed on the boom arm 15 to protect the hull of a boat or any other object that comes in contact with the boom arm 15 when being loaded onto a trailer. The protective sleeve 35 is preferably a polyurethane foam cover that is over-molded onto the boom arm 15. The over-molding process provides a tight fit for the protective sleeve 35. In addition to providing cushioning and protection for water craft being loaded on the trailer, the protective sleeve 35 helps prevent corrosion of the boom arm 15.

Figure 2:
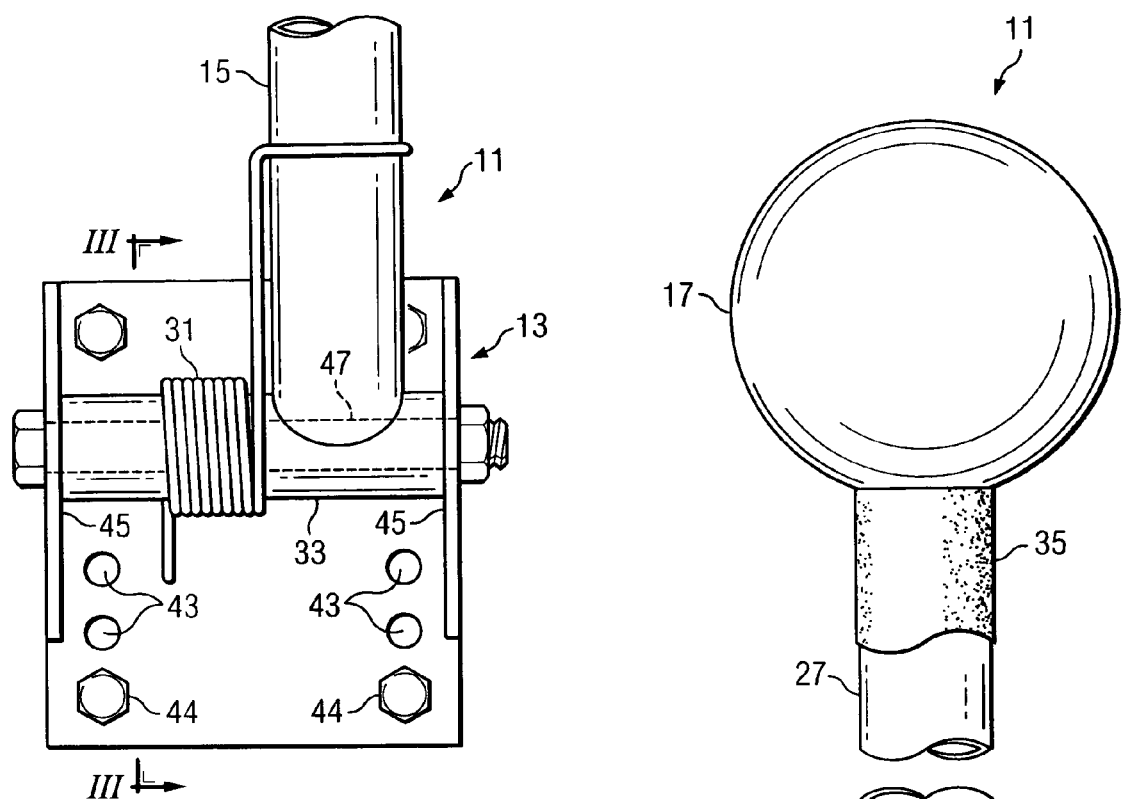
FIG. 2 illustrates a front view of the trailer position indicator of FIG. 1.
Figure 3:
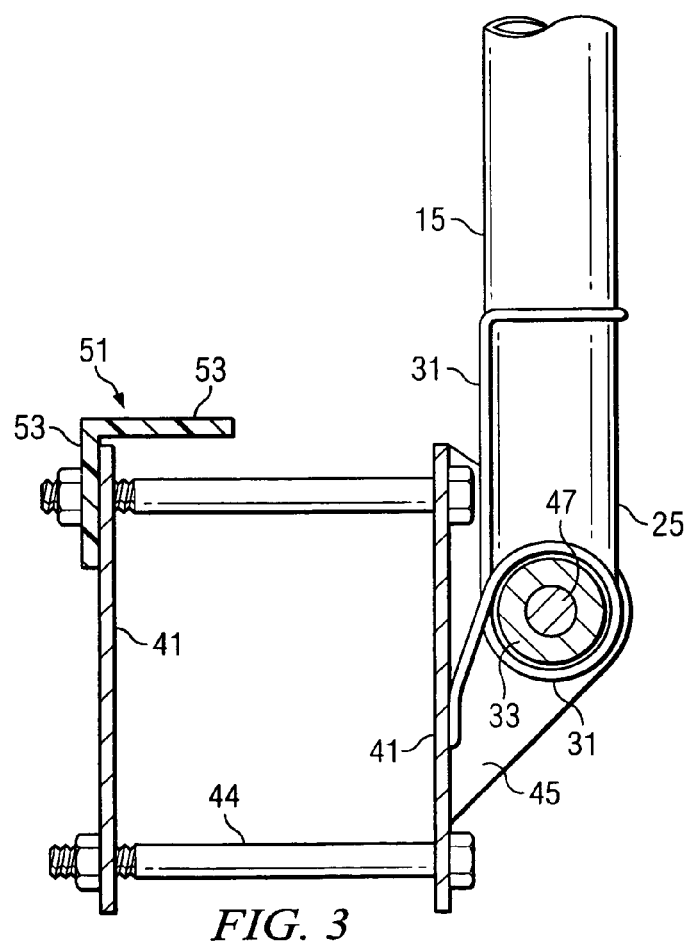
FIG. 3 depicts a cross-sectional side view of the trailer position indicator of FIG. 2 taken at III—III.
Figure 5:
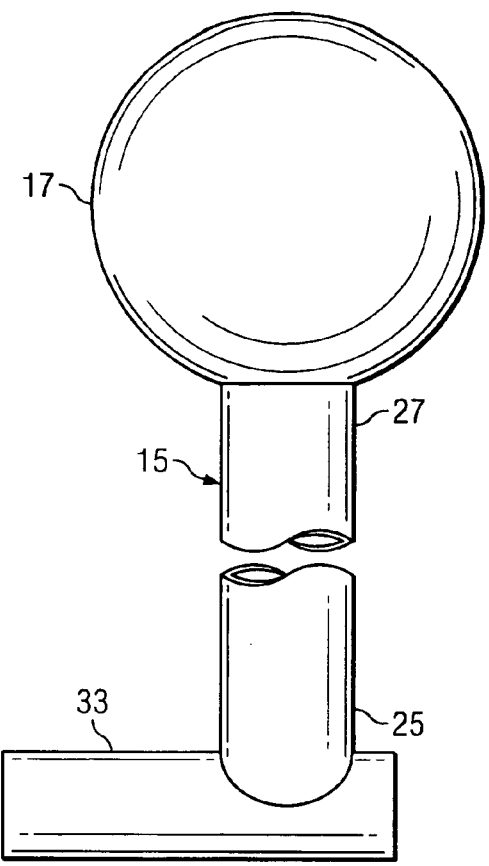
FIG. 5 depicts a front view of the boom arm and guidance member of FIG. 1.

Trailer attachment member 13 preferably includes a pair of attachment plates 41 for receiving a cross member 42 (see FIG. 1) of the trailer. Each fastener plate 41 includes a plurality of holes 43 for receiving fasteners 44 to secure the plates 41 to the trailer cross member 42. Preferably the fasteners 44 are bolts secured by locking nuts. As the bolts and nuts are tightened, the cross member 42 is sandwiched between the plates 41. As illustrated in FIGS. 1 and 2, the lower most fasteners can be placed in any of a plurality of fastener holes depending on the size of the cross member 42. A pair of lugs 45 is disposed on one of the attachment plates 41. An axle 47, which could be a bolt or a dowel, is disposed between the lugs 45 for receiving sleeve 33 on the lower end 25 of the boom arm 15. The axle 47 allows the boom arm 15 to rotate relative to the trailer attachment member 13. The torsion spring 31 is disposed around sleeve 33 and interacts with both the boom arm 15 and the trailer attachment member 13 to bias the boom arm 15 into the extended position (shown in FIG. 1).

A bracket protector 51 is used in conjunction with the trailer attachment member 13 to protect the hull of watercraft or other objects being loaded on the trailer that may come in contact with the trailer attachment member 13. The bracket protector 51 preferably includes a pair of legs 53 integrally connected to form a substantially L-shaped cross-section. The bracket protector 51 is preferably made from high density polyethylene (HDPE) but could be made from any other plastic or material that would provide protection to a boat hull or other object that contacts the bracket protector 51.

Figure 4:
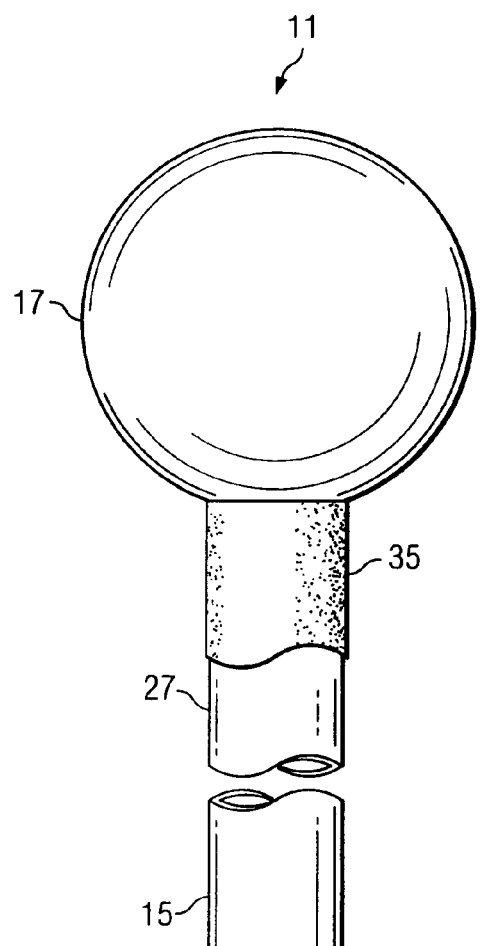
FIG. 4 illustrates a cross-sectional side view of a trailer position indicator similar to that shown in FIG. 3, the trailer position indicator having an alternative trailer attachment member according to the present invention.
Figure 4:
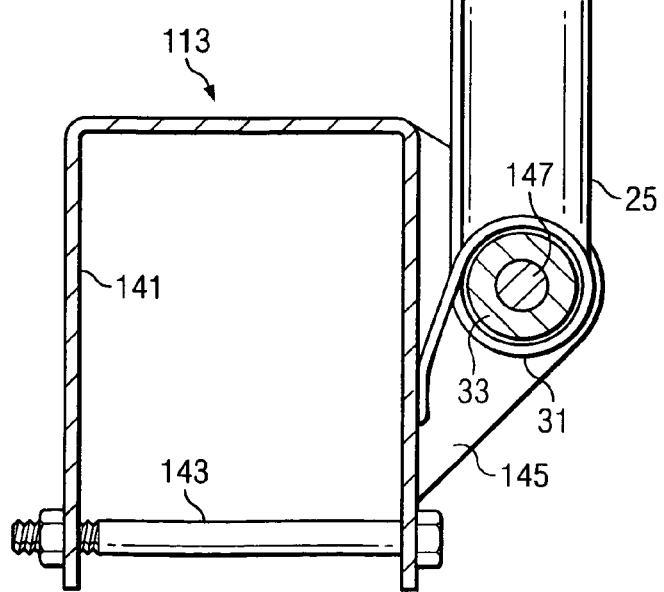

Referring more specifically to FIG. 4, an alternative trailer attachment member 113 includes a channel 141 for receiving a cross member (not shown) of the trailer. A fastener 143 is provided to secure the trailer attachment member 113 to the cross member of the trailer. In a preferred embodiment, a pair of lugs 145 is disposed on the trailer attachment member 113. An axle 147, which could be a bolt or a dowel, is disposed between the lugs 145 for receiving sleeve 33 on the lower end 25 of the boom arm 15. The axle 147 allows the boom arm 15 to rotate relative to the trailer attachment member 113. Torsion spring 31 is attached around sleeve 33 and interacts with both the boom arm 15 and the trailer attachment member 113 to bias the boom arm 15 into the extended position. Although not illustrated in FIG. 4, trailer attachment member 113 could also be used with a bracket protector 51.

In a preferred embodiment, guidance member 17 is a round, hollow, water-tight ball that is brightly colored for high visibility. The guidance member 17 is threadingly attached to the boom arm 15, but could be attached by press fit, by using adhesive, or by any other attachment method. A person of ordinary skill in the art will recognize that different shapes or colors could be used for guidance member 17. One such shape could be a flat, solid, paddle-shaped guidance member. A paddle-shaped guidance member could reduce the amount of material required to make the structure, yet still provide adequate surface area that is highly visible to a vehicle driver. The primary objective of the guidance member 17 is to provide a large, visible object for indicating the position of the trailer to the driver of the vehicle. Alternatively, a smaller, illuminated device could be used as guidance member 17. Illumination may be provided by either incandescent bulbs, halogen bulbs, light emitting diodes (LEDs), or glow-in-the-dark materials such as phosphorescent materials. Although not preferred, the use of a guidance member 17 could be completely omitted, as long as the boom arm 15 is made highly visible to the driver of the vehicle.

A depth ring 59 (see FIG. 1) may also be adjustably attached to the boom arm 15 of the trailer position indicator. Preferably, depth ring 59 is made of plastic, metal, or another rigid material, but the depth ring could also be made from an elastomeric material. If made from an elastomeric material, the depth ring 59 would preferably be an O-ring with a diameter slightly smaller than the diameter of the boom arm 15 to allow the ring to be "rolled" up or down the boom arm 15. The depth ring 59 is adjustable along the boom arm 15 and can be selectively placed to indicate the depth of the water after a boat is dropped into the water. Then, when the boat trailer is being backed into the water to pick up the boat, the person backing the trailer will know to stop the trailer when the depth ring 59 nears the surface of the water (i.e. the correct depth has been reached). Depth ring 59 is preferably either painted fluorescent or is made from a glow-in-the-dark material to allow the ring to be visible in low light conditions. The depth ring 59 may also be buoyant and configured to float upward on the boom arm 15 when the boat is initially dropped into the water. A locking mechanism (not shown), such as a flexible seal attached to the depth ring between the depth ring and the boom arm, would prevent the depth ring from dropping down the boom arm 15 as the trailer is pulled from the water. The flexible seal would essentially provide a friction fit between the depth ring and the boom arm 15 that could be overcome by the buoyancy force exerted on the ring when the depth ring was underwater. After sliding up the boom arm to the surface of the water, the friction force between the flexible seal and the boom arm would prevent the depth ring from slipping down the boom arm as the trailer was pulled from the water. Since the depth ring is automatically locked on the boom arm 15 at the correct water depth, the person backing the trailer prior to loading the boat would know exactly how deep to back the trailer into the water.

Indicia 61 (see FIG. 1) could be placed on the boom arm 15 and/or the guidance member 17 to advertise goods and/or services. When used with watercraft trailers, advertising could be particularly effective. Many jurisdictions have laws preventing the advertisement of alcohol at marinas and other businesses located near a body of water. Since the trailer position indicator would be installed on the trailers of individual citizens, it could possibly be used to advertise alcohol-related products. Alternatively, the indicia 61 may be used to advertise fishing-related products, marine and boating-related products, water recreation-related products, or any other type of product or service. Indicia 61 could also be used to display boating safety tips or could be personalized to assist an individual in finding his trailer in a busy marina parking lot.

Figure 6:
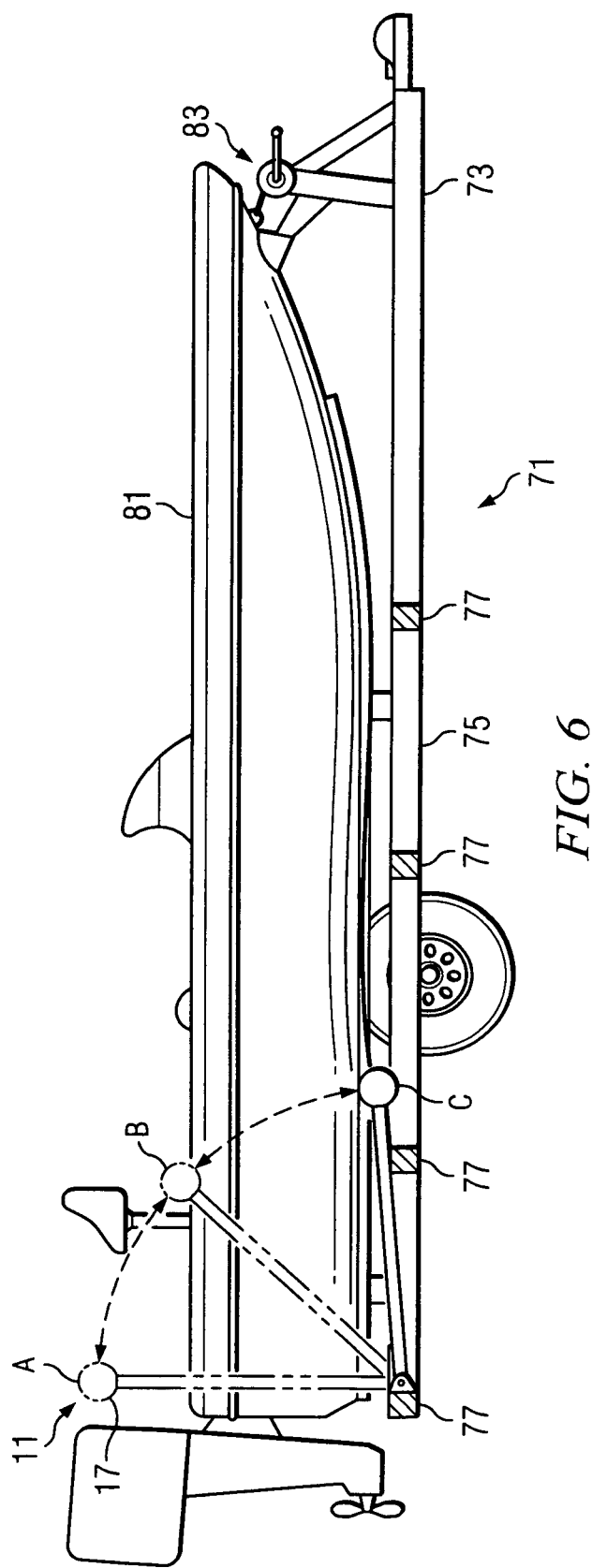
FIG. 6 illustrates a side view of the trailer position indicator of FIG. 1, the trailer position indicator being schematically shown installed on a boat trailer in an extended position, an intermediate position, and a stowed position.
Figure 7:
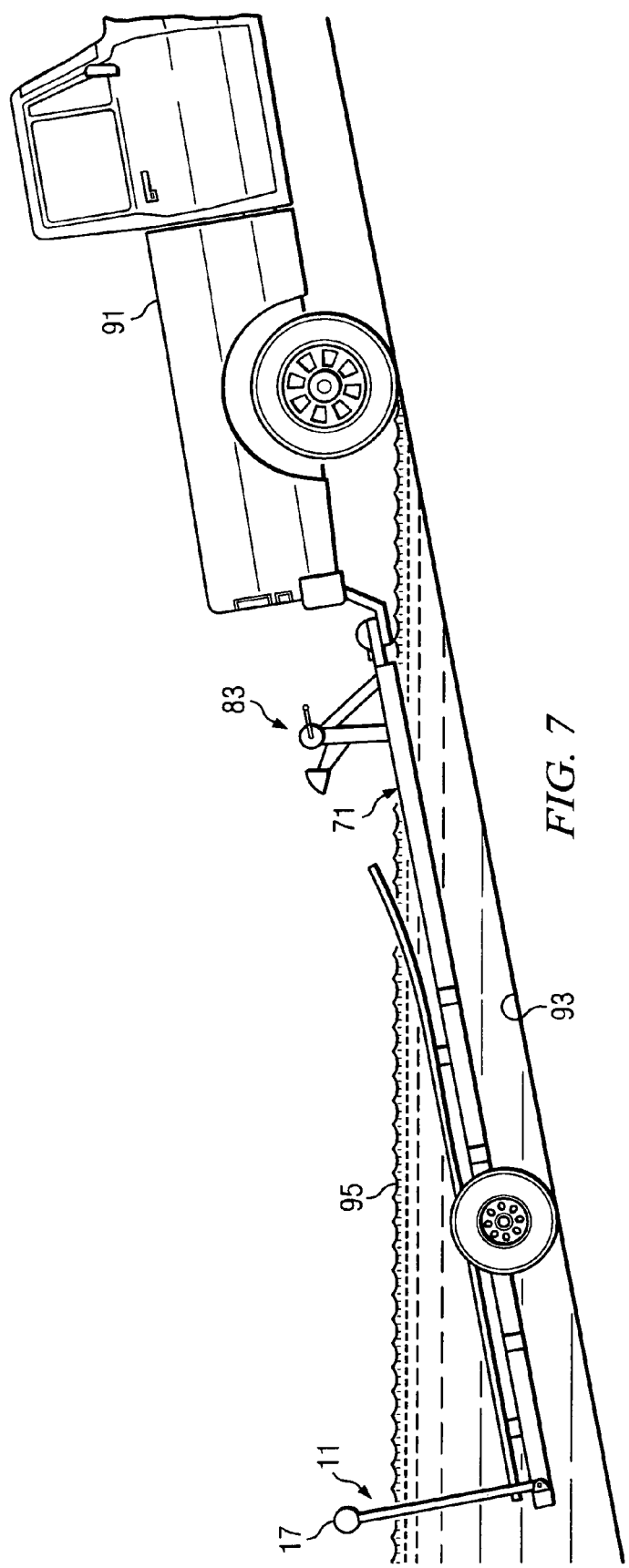
FIG. 7 depicts a side view of the trailer position indicator of FIG. 1 installed on a boat trailer, the boat trailer being shown on a boat ramp with the trailer position indicator in the extended position.

Referring to FIGS. 6 and 7, the operation of trailer position indicator 11 is illustrated. The invention is used in connection with a boat trailer 71 having a tongue 73, a pair of main beams 75, and a plurality of cross members 77 rigidly attached between the main beams 75. A boat 81 is carried by the boat trailer 71 and is secured to a bow support assembly 83 attached to the tongue 73 of the trailer 71.

The trailer position indicator 11 is preferably attached to the rear most cross member 77 of the trailer 71 such that the cross member 77 is received between the attachment plates 41 of the trailer attachment member 13 (also see FIG. 1). Trailer position indicator 11 is positioned approximately half way between the main beams 75, which corresponds to the approximate centerline of the trailer. In FIG. 6, the trailer position indicator 11 is schematically illustrated in three positions: an extended position A (also shown in FIG. 1), an intermediate position B, and a stowed position C. The intermediate position B is any position between the extended position A and the stowed position C.

When boat 81 is loaded on trailer 71 (see FIG. 6), the weight of the boat pushes the boom arm 15 and the guidance member 17 into the stowed position C. In the stowed position C, the guidance member 17 rests against the bottom of the boat since the torsion spring biases the boom arm 15 toward the extended position. When boat 81 is removed from trailer 71 (see FIG. 7), the force imposed by the torsion spring moves boom arm 15 and guidance member 17 into the extended position A.

Referring more specifically to FIG. 7, the trailer position indicator 11 assists a driver of a vehicle 91 in locating the position of trailer 71 when boat 81 is not on the trailer 71. For example, in order to reload the boat 81 on trailer 71 after a day of recreation, the driver will be required to back the trailer 71 down a boat ramp 93 that extends into the water 95. The empty boat trailer 81 would normally be impossible to see beneath the rear portion of vehicle 91. The disposition of the trailer position indicator 11 on the center of the rear cross member 77 allows the driver to know the exact position of the trailer 71 behind vehicle 91 as the trailer is backed into the water 95. The depth ring 59 installed on the boom arm 15 would also communicate how far to back the trailer into the water.

As boat 81 is loaded onto trailer 71, the guidance member 17 also provides assistance to the boat driver loading the boat. Since the trailer position indicator is centrally located on the trailer, the boat driver can steer the boat according to a line of sight between the guidance member 17 and the bow support assembly 83. As the boat nears the trailer and contacts the guidance member 17, the guidance member 17 and boom arm 15 are slowly moved (by the weight of the boat) into the stowed position C.

Although the operation of the present invention has been illustrated in connection with a boat trailer, the trailer position indicator could be used with any trailer, including without limitation flat bed trailers, personal watercraft trailers, and dog trailers. A person having skill in the art will also recognize that the various portions of the trailer position indicator could be made of steel, aluminum, plastic, or any other material that would provide enough rigidity to place the guidance member in the extended position. The trailer position indicator could also be integrally attached to newly manufactured trailers. The integral attachment would likely involve the use of lugs welded to the trailer, the lugs being configured to pivotally receive the boom arm.

It should be apparent from the foregoing that an invention having significant advantages has been provided. While the invention is shown in only a few of its forms, it is not just limited but is susceptible to various changes and modifications without departing from the spirit thereof.

We claim:

1. A trailer position indicator comprising:
   a trailer attachment member configured to be attached to a trailer;
   a boom arm having an upper end and a lower end, the lower end of the boom arm being pivotally connected to the trailer attachment member;
   a guidance member connected to the upper end of the boom arm; and
   a protective sleeve disposed on the boom arm to provide protection between the boom arm and an object being loaded onto the trailer; and
   a bracket protector having a pair of legs integrally connected to form a substantially L-shaped cross section, and wherein the bracket protector is connected to the trailer attachment member to prevent a boat from contacting the trailer attachment member during loading and unloading.

2. A trailer position indicator according to claim 1, wherein the protective sleeve protects a boat during loading and unloading as the boat contacts the boom arm.

3. A trailer position indicator according to claim 1, wherein the protective sleeve is made from polyurethane.

4. A trailer position indicator according to claim 1, wherein the boom arm is over-molded with polyurethane to form the protective sleeve.

5. A trailer position indicator comprising:
   a trailer attachment member having a first and second attachment plate adjustably connected by a plurality of fasteners, the first and second attachment plates configured to be attached to a trailer;
   a boom arm having an upper end and a lower end, the lower end of the boom arm being pivotally connected to the trailer attachment member;
   a guidance member connected to the upper end of the boom arm;
   a torsion spring operably attached to the trailer attachment member and the boom arm to bias the boom arm toward an extended position; and
   a protective member having a pair of legs integrally connected to form a substantially L-shaped cross-section, one of the legs of the protective member being attached to the second attachment plate such that the other leg of the protective member is positioned above the second attachment plate to provide protection between the second attachment plate and an object being loaded onto the trailer.

6. A trailer position indicator according to claim 5, wherein the protective member is made from high density polyethylene.

7. A trailer position indicator according to claim 5, wherein the boom arm is capable of being placed in a stored position as a boat is loaded on the trailer.

8. A trailer position indicator according to claim 5 further comprising a protective sleeve disposed on the boom arm to provide protection between the boom arm and an object being loaded onto the trailer.

9. A trailer position indicator according to claim 8, wherein the boom arm is over-molded with polyurethane to form the protective sleeve.

10. A trailer position indicator comprising:
- a trailer attachment member having a first and second attachment plate adapted to be connected by a plurality of fasteners to a cross member of a boat trailer such that the cross member is disposed between the attachment plates;
- a pair of lugs attached to the first attachment plate on a surface of the first attachment plate facing away from the second attachment plate when the plates are installed on the cross member;
- an axle rigidly positioned between the lugs;
- a boom arm having an upper end and a lower end, the lower end of the boom arm being connected to a boom sleeve that is pivotally positioned on the axle;
- a protective sleeve disposed on the boom arm to provide protection between the boom arm and a boat being loaded onto or unloaded from the trailer;
- a guidance member connected to the upper end of the boom arm;
- a torsion spring operably attached to the trailer attachment member and the boom arm to bias the boom arm toward an extended position; and
- a protective member having a pair of legs integrally connected to form a substantially L-shaped cross-section, one of the legs of the protective member being attached to the second attachment plate such that the other leg of the protective member is positioned above the second attachment plate to provide protection between the second attachment plate and the boat being loaded onto or unloaded from the trailer.

11. A trailer position indicator according to claim 10, wherein the protective member is made from high density polyethylene.

12. A trailer position indicator according to claim 10, wherein the boom arm is over-molded with polyurethane to form the protective sleeve.

* * * * *